United States Patent
Liobe et al.

(10) Patent No.: US 10,267,902 B2
(45) Date of Patent: Apr. 23, 2019

(54) DIGITAL ROIC ENHANCEMENT AND REPETITION FREQUENCY DECODING OF ASYCHRONOUS LASER PULSES

(71) Applicant: Sensors Unlimited, Inc., Princeton, NJ (US)

(72) Inventors: John Liobe, New York, NY (US); Joshua Lund, Dallas, TX (US)

(73) Assignee: Sensors Unlimited, Inc., Princeton, NJ (US)

( * ) Notice: Subject to any disclaimer, the term of this patent is extended or adjusted under 35 U.S.C. 154(b) by 252 days.

(21) Appl. No.: 15/425,760

(22) Filed: Feb. 6, 2017

(65) Prior Publication Data

US 2018/0224532 A1    Aug. 9, 2018

(51) Int. Cl.
| | |
|---|---|
| *H01L 27/00* | (2006.01) |
| *G01S 7/486* | (2006.01) |
| *G01S 7/48* | (2006.01) |
| *G01S 7/487* | (2006.01) |
| *G01J 1/42* | (2006.01) |

(52) U.S. Cl.
CPC .......... *G01S 7/4863* (2013.01); *G01S 7/4804* (2013.01); *G01S 7/487* (2013.01); *G01J 2001/4238* (2013.01)

(58) Field of Classification Search
CPC ...... G01S 7/486; G01S 7/4861; G01S 7/4863; G01J 2001/4238
USPC .................................. 250/208.1, 214 R, 226
See application file for complete search history.

(56) References Cited

U.S. PATENT DOCUMENTS

| | | | |
|---|---|---|---|
| 5,128,601 A | * | 7/1992 | Orbach ..................... H01S 3/13 372/25 |
| 7,206,062 B2 | | 4/2007 | Asbrock et al. |
| 8,581,168 B2 | | 11/2013 | Linder et al. |
| 9,191,582 B1 | | 11/2015 | Wright et al. |
| 9,261,357 B2 | | 2/2016 | Stettner |
| 9,420,264 B2 | | 8/2016 | Gilliland et al. |
| 2012/0261553 A1 | | 10/2012 | Elkind et al. |
| 2016/0054434 A1 | | 2/2016 | Williams et al. |
| 2016/0293647 A1 | | 10/2016 | Lin et al. |
| 2016/0295148 A1 | | 10/2016 | Lin et al. |
| 2018/0227519 A1 | * | 8/2018 | Liobe .................. H04N 5/3658 |

OTHER PUBLICATIONS

K. Schultz, Lincoln Laboratory Journal, vol. 20, No. 2, 2014 (16 pages).

* cited by examiner

*Primary Examiner* — Kevin K Pyo
(74) *Attorney, Agent, or Firm* — Locke Lord LLP; Scott D. Wofsy; Joshua L. Jones

(57) ABSTRACT

A method includes acquiring a pulse detection bitmap from an imaging sensor array into a digital read out integrated circuit (DROIC), filtering the pulse detection bitmap within the DROIC to convert the pulse detection bitmap into a filtered pulse detection bitmap, and determining for a given pixel in the filtered pulse detection bitmap whether the pixel has a value that exceeds a threshold, indicating a true laser pulse return has been detected in the pixel.

24 Claims, 4 Drawing Sheets

True Return plane #2

| 0 | 0 | 0 | 0 | 0 |
|---|---|---|---|---|
| 0 | 0 | 0 | 1 | 0 |
| 0 | 0 | 0 | 0 | 0 |
| 0 | 0 | 0 | 0 | 0 |
| 0 | 0 | 0 | 0 | 0 |

TOA register #2

| 0 | 0 | 0 | 0 | 0 |
|---|---|---|---|---|
| 0 | 0 | 0 | TOA2 | 0 |
| 0 | 0 | 0 | 0 | 0 |
| 0 | 0 | 0 | 0 | 0 |
| 0 | 0 | 0 | 0 | 0 |

*Fig. 8*

TOA register #2

| 0 | 0 | 0 | 0 | 0 |
|---|---|---|---|---|
| 0 | 0 | 0 | TOA2-TOA1 | 0 |
| 0 | 0 | 0 | 0 | 0 |
| 0 | 0 | 0 | 0 | 0 |
| 0 | 0 | 0 | 0 | 0 |

*Fig. 9*

DIGITAL ROIC ENHANCEMENT AND REPETITION FREQUENCY DECODING OF ASYCHRONOUS LASER PULSES

BACKGROUND OF THE INVENTION

1. Field of the Invention

The present disclosure relates to imaging decoding of asynchronous laser pulses.

2. Description of Related Art

Lasers are commonly used in observation and targeting applications, for example, in guiding laser-guided munitions or weapons to a target. Targeting systems may observe and detect the range of an object. Targeting systems may also designate a target for detection by another weapon system in order to deliver the weapon to the designated target. Such targeting systems generally use a set of devices to perform the operations described with precision, for example, global positioning systems, observation binoculars, laser rangefinders, digital magnetic compasses, and laser designators.

In order to image and decode the repetition frequency of asynchronous laser pulses, standard electro-optical systems perform signal processing at multiple levels in the signal chain. Firstly, the Read-Out Integrated Circuit (ROIC) receives illumination and performs a first pass at processing the acquired signal. Subsequently, this initially-processed signal is conveyed to another processing unit, which can take the form of a Field Programmable Array (FPGA), Digital Signal Processor (DSP), or some other type of processor, in order to extract high fidelity information from the acquired signal. One desired result of signal processing can be the pulse repetition frequency (PRF) code, which is highly useful in laser range finding (LRF) applications. This additional processing step adds significant undesirable power consumption, latency, and cost to the information extraction process.

While conventional systems and techniques have been considered adequate for their intended purposes, there is an ever present need for improved imaging and decoding of asynchronous laser pulses. This disclosure provides a solution to this need.

SUMMARY OF THE INVENTION

A method includes acquiring a pulse detection bitmap from an imaging sensor array into a digital read out integrated circuit (DROIC), filtering the pulse detection bitmap within the DROIC to convert the pulse detection bitmap into a filtered pulse detection bitmap, and determining for a given pixel in the filtered pulse detection bitmap whether the pixel has a value that exceeds a threshold, indicating a true laser pulse return has been detected in the pixel.

The method can include reading out location and time of arrival (TOA) for at least one pixel in the filtered pulse detection bitmap that corresponds to a true laser pulse return location, and not reading out location or TOA for at least one pixel in the filtered pulse detection bitmap that does not correspond to a true laser pulse return location. Acquiring the pulse detection bitmap can include recording a pulse indicator bit for each pixel in the imaging sensor array. The pulse detection bitmap can be binary, where a logical 1 indicates detection of a laser pulse at a given pixel in the imaging sensor array. Determining whether the pixel has a value that exceeds the threshold can be performed in the DROIC. Filtering the pulse detection bitmap can include processing the pulse detection bitmap with a filter kernel by iteratively shifting the pulse detection bitmap over a kernel size using a pulse indicator bit as an enable to a counter. The number of clocks provided to a counter between each shift can represent kernel weighting values for filtering.

Acquiring the pulse detection bitmap can include latching a value from a global counter into a local counter for each pixel, indicative of the time of arrival of a first pulse. The method can include calculating at least in part a pulse repetition frequency directly in a pixel array of the DROIC. When a true return is detected, location and TOA for a given true return pixel can be propagated to a second storage register in adjacent pixels within the DROIC through horizontal and/or vertical shifts. The TOA for the true return pixel can be a first TOA, and the method can include obtaining a second TOA associated with detection of a second laser pulse in the true return pixel and/or one or more of the adjacent pixels, and subtracting the first TOA from the second TOA to obtain a pulse repetition frequency (PRF) for the true return. The first TOA and the second TOA can be read out from the DROIC together and are subtracted in an external processor to calculate the PRF. The first TOA can be subtracted from the second TOA within the DROIC, wherein a single pulse period value is read out from the DROIC. Passive imaging data can be simultaneously acquired and later read out through the DROIC.

A system includes an imaging sensor array and a read out integrated circuit operatively connecting the imaging sensor array to a digital read out integrated circuit (DROIC) for communicating a pulse detection bitmap from pixels in the imaging sensor array to corresponding pixels in the DROIC. The DROIC is configured to filter the pulse detection bitmap within the DROIC to convert the pulse detection bitmap into a filtered pulse detection bitmap, and determine for a given pixel in the filtered pulse detection bitmap whether the pixel has a value that exceeds a threshold, indicating a true laser pulse return has been detected in the pixel.

The DROIC can be configured to read out location and time of arrival (TOA) for at least one pixel in the filtered pulse detection bitmap that corresponds to a true laser pulse return location, and not reading out location or TOA for at least one pixel in the filtered pulse detection bitmap that does not correspond to a true laser pulse return location. The imaging sensor array can be configured to record a pulse indicator bit for each pixel in the imaging sensor array.

The DROIC can be configured to acquire the pulse detection bitmap wherein the pulse detection bitmap is binary, where a logical 1 indicates detection of a laser pulse at a given pixel in the pulse detection bitmap. The DROIC can be configured to filter wherein filtering the pulse detection bitmap includes processing the pulse detection bitmap with a filter kernel by iteratively shifting the pulse detection bitmap over a kernel size using a pulse indicator bit as an enable to a counter. The DROIC can be configured so the number of clocks provided to a counter between each shift represents kernel weighting values for filtering.

The DROIC can be configured to acquire the pulse detection bitmap wherein the pulse detection bitmap includes latching a value from a global counter into a local counter for each pixel, indicative of the time of arrival of a first pulse. The DROIC can be configured for calculating pulse repetition frequency directly in a pixel array of the DROIC. The DROIC can be configured so when a true return is detected, location and TOA for a given true return pixel are propagated to a second storage register in adjacent pixels within the DROIC through horizontal and/or vertical shifts. The system can be configured to acquire passive imaging data simultaneously wherein the DROIC is configured to receive the passive imaging data.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 5 is a representation of the true return plane or bitmap in the DROIC and the corresponding time of arrival (TOA) register in the DROIC, showing the states after a true return is detected after applying the threshold to the filtered pulse detection bitmap;

FIG. 6 is a representation of the true return plane and TOA register of FIG. 5 after shifting using the true return bit as a shift enable;

FIG. 7 is a representation of the true return plane and TOA register of FIG. 5, after shifting without using the true return bit as a shift enable mask, which centers the Region of Interest (ROI);

FIG. 8 is a representation of the true return plane and TOA register of FIG. 5 after a second laser pulse is detected; and FIG. 9 is a representation of the TOA register of FIG. 5, showing the calculation of pulse repetition frequency inside a pixel location of the DROIC.

DETAILED DESCRIPTION OF THE PREFERRED EMBODIMENTS

Figure 1:
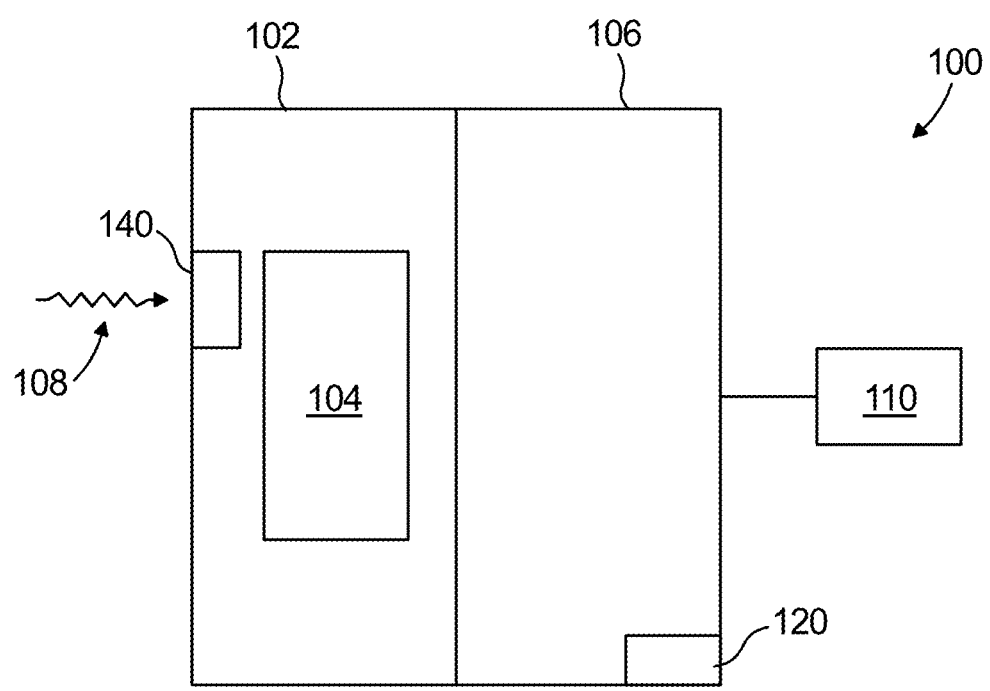
FIG. 1 is a schematic view of an exemplary embodiment of a system constructed in accordance with the present disclosure, showing a laser pulse detected by the system.

Reference will now be made to the drawings wherein like reference numerals identify similar structural features or aspects of the subject disclosure. For purposes of explanation and illustration, and not limitation, a partial view of an exemplary embodiment of a system in accordance with the disclosure is shown in FIG. 1 and is designated generally by reference character 100. Other embodiments of systems in accordance with the disclosure, or aspects thereof, are provided in FIGS. 2-9, as will be described. The systems and methods described herein can be used to provide full array processing with common sequential instructions, e.g., for decoding asynchronous laser pulses, e.g., for determining pulse repetition frequency (PRF). PRF-related information and imaging information can be used together, e.g. displayed to a user together in an overlay or other suitable mode. This disclosure provides a solution for more efficiently obtaining a PRF code while simultaneously capturing passive imaging data.

Figure 2:
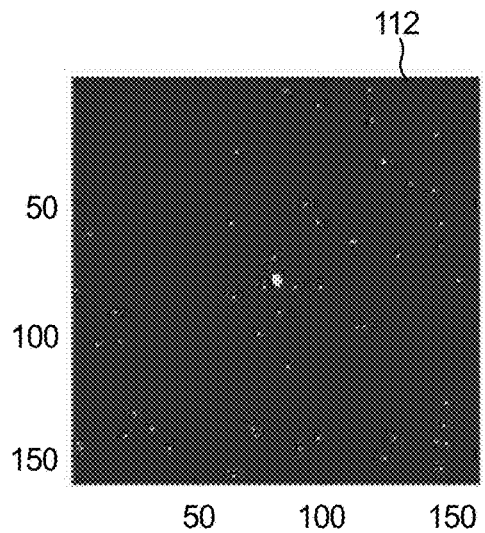
FIG. 2 is graphical representation of an exemplary pulse detection bitmap in the system of FIG. 1, showing the binary pixel information acquired by the digital read out integrated circuit (DROIC) from the imaging sensor array.

System 100 includes an imaging sensor array 102, which has a read out integrated circuit (ROIC) 104 operatively connecting the imaging sensor array 102 to a digital read out integrated circuit (DROIC) 106 for communicating a pulse detection bitmap 112, shown in FIG. 2, from pixels 140 (only one of which is depicted in FIG. 1 for sake of clarity) in the imaging sensor array 102 to corresponding pixels in the DROIC 106. The DROIC 106 is configured to operate as described below, so that as laser pulses from source 108, which can include reflections from a laser illuminated source, for example, are incident on imaging array 102, DROIC 106 provides information to a processor 110 external to DROIC 106 regarding the pulse repetition frequency (PRF) of laser pulse of source 108.

A method includes acquiring a pulse detection bitmap, e.g., bitmap 112 of FIG. 2, from an imaging sensor array, e.g., imaging sensor array 102, into a digital read out integrated circuit (DROIC), e.g., DROIC 106. This can include receiving photocurrent from an array of photodetectors, e.g., pixels 140, at least some of which may have been generated by a pulsed laser illuminator, using the frequency characteristics of the photocurrent to detect the presents of laser pulses, generating a pulse detection bitmap based on this determination, and conveying this pulse detection bitmap into DROIC 106.

The DROIC 106 is composed of pixels with digital-only circuit elements at each pixel location. Both the intra-connections within the DROIC pixel circuit elements and the inter-connections between DROIC pixels can be rearranged to support a host of digital functions at both the pixel pitch and super pixel pitch configurations. The DROIC 106 can be a reconfigurable portion of the ROIC 104, or can actually sit on another physical layer of the system 100, as depicted in FIG. 1.

Figure 3:
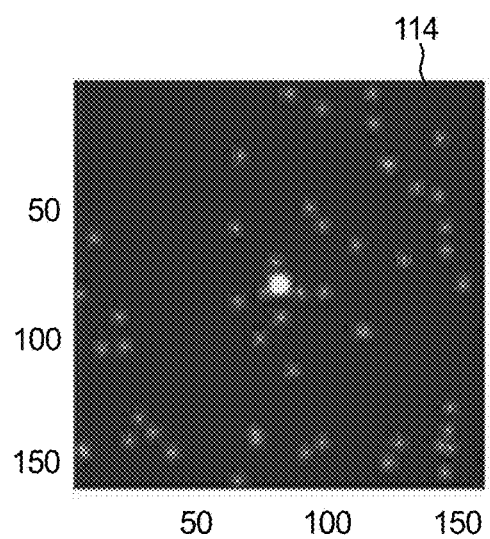
FIG. 3 is graphical representation of the pulse detection bitmap of FIG. 2, after a filter kernel is applied.
Figure 4:
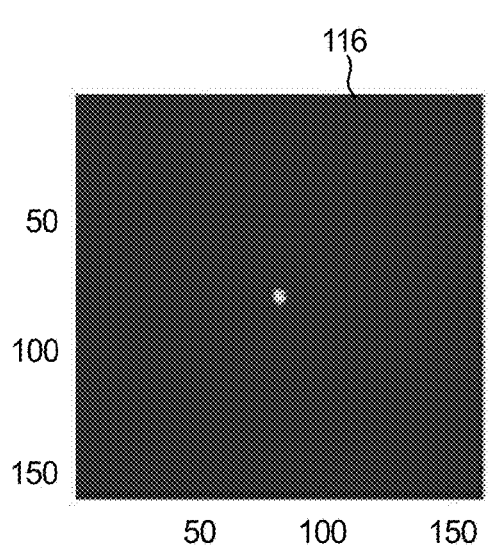
FIG. 4 is a graphical representation of the filtered pulse detection bitmap of FIG. 3, after a threshold is applied to generate a true return.

The method includes filtering the pulse detection bitmap 112 within the DROIC 106 to convert the pulse detection bitmap into a filtered pulse detection bitmap, e.g., filtered pulse detection bitmap 114 of FIG. 3, and determining for a given pixel in the filtered pulse detection bitmap 114 whether the pixel has a value that exceeds a threshold, i.e., the value of the pixel is greater than a predetermined threshold value, which indicates a true laser pulse return has been detected in the pixel. FIG. 4 shows the true return bitmap 116 after the threshold operation is performed on the filtered pulse detection bitmap 114 from FIG. 3. True return bitmap 116 shows a single true return dot 118 in this example. Those skilled in the art having had the benefit of this disclosure will readily appreciate that multiple true returns can be detected and processed without departing from the scope of this disclosure.

The method also includes reading out location and time of arrival (TOA) for at least one pixel in the filtered pulse detection bitmap 114 that corresponds to a true laser pulse return location, and not reading out location or TOA for at least one pixel in the filtered pulse detection bitmap 114 that does not correspond to a true laser pulse return location. For example, DROIC 106 can read out to external processor 110 the location and TOA for the white pixels in FIG. 4, but not for the black pixels to save bandwidth between the DROIC 106 and processor 110, as well as saving processing resources within processor 110.

Acquiring the pulse detection bitmap can include recording a pulse indicator bit for each pixel in the imaging sensor array 102. The pulse detection bitmap can be binary, where a logical 1 indicates the detection of a laser pulse at a given pixel in the pulse detection bitmap, and a logical 0 indicates absence of a laser pulse.

Filtering the pulse detection bitmap can include processing the pulse detection bitmap with a filter kernel by iteratively shifting the pulse detection bitmap over a kernel size using a pulse indicator bit as an enable to a counter, e.g., global counter 120 which resides in DROIC 106 in FIG. 1, which can all be performed within DROIC 106, to arrive at the filtered pulse detection bitmap 114 of FIG. 3. The number of clocks provided to a counter between each shift can represents kernel weighting values for filtering. At the conclusion of the kernel processing, the final counter value is compared to a threshold to determine whether a true laser pulse return has been detected. Simultaneously, acquisition of the pulse detection bitmap can include latching a value from the global counter 120 into a local counter for each pixel in the DROIC 106, indicative of the time of arrival (TOA) of a first pulse. Determining whether the pixel has a value that exceeds a threshold can be performed in the DROIC 106, to produce the bitmap of FIG. 4.

Figures 5, 6, 7:
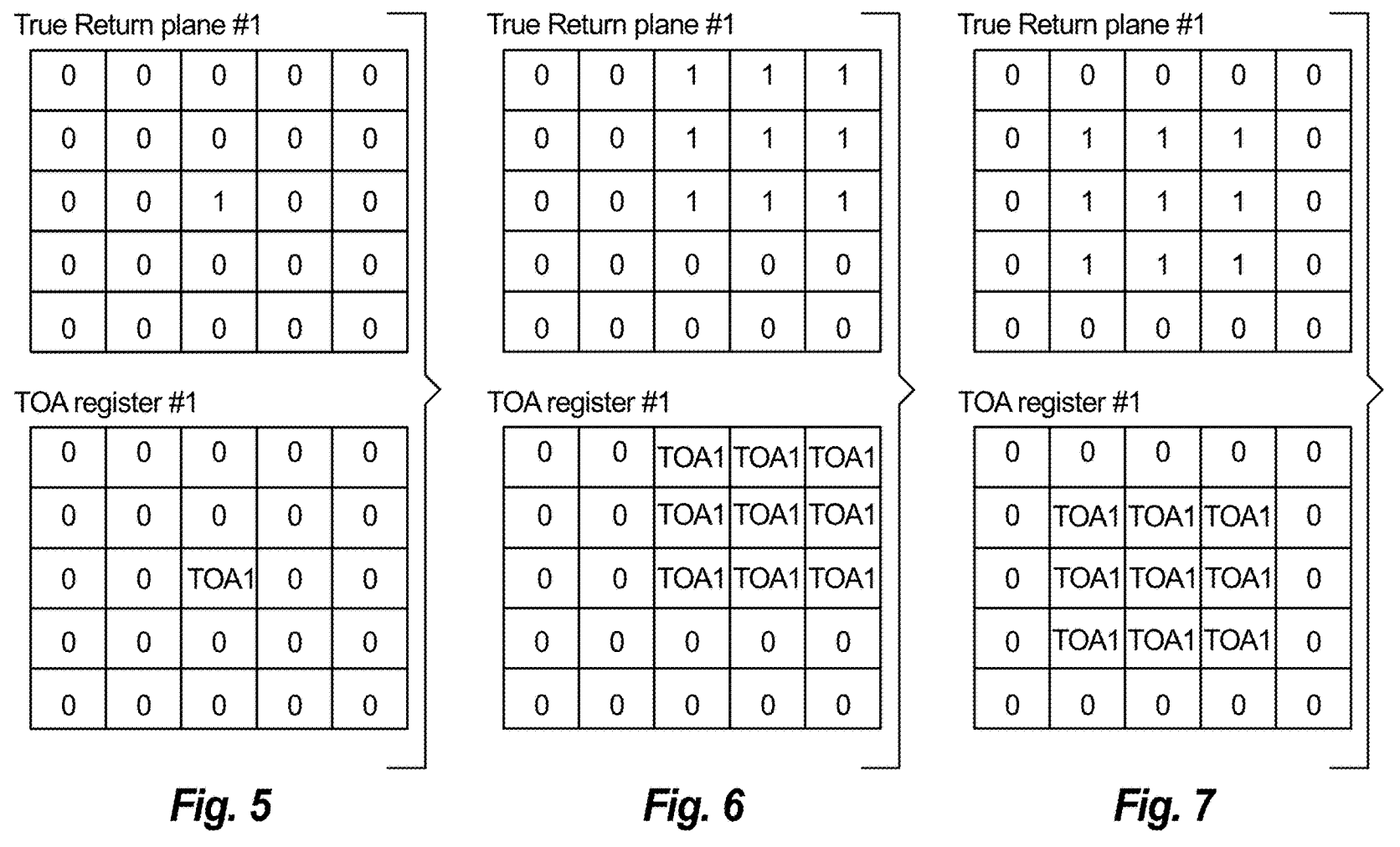

With reference now to FIG. 5, the method can include the calculation of the pulse repetition frequency, wherein the calculation is done at least in part directly in a pixel array of the DROIC 106. When a true return is detected, as indicated by the 1 in the true return plane of FIG. 5, its TOA is recorded in the TOA register, as indicated by TOA1 in FIG. 5. The location (in the true return plane) and TOA (in the TOA register) for a given true return pixel can be propagated to a second storage register in adjacent pixels within the DROIC through horizontal and/or vertical shifts, as shown in the true return plane and TOA register of FIG. 6. The pulse bit, e.g., the 1 in FIG. 5, serves as a shift enable bit for the adjacent pixels. The shifted example in FIG. 6 is shifted to anticipate where the true return location will be in the following frame, e.g., to account for movement of the system 100 and/or the laser source 108 of FIG. 1. Any suitable shift direction or amount can be used, or as shown in FIG. 7, the shift enable can be configured to center the Region of Interest (ROI) on the original true return pixel of FIG. 5.

With reference now to FIG. 8, the DROIC 106 can obtain a second TOA, as indicated by TOA2 in FIG. 8, associated with a second laser pulse detected in imaging sensor array 102 and represented by a logical 1 in true return pixel plane in FIG. 8. The pixel of TOA2 coincides with one of the pixels from FIG. 6 where TOA1 was registered. So for that pixel where TOA1 and TOA2 were both registered, the first TOA (TOA1 from FIG. 6) can be subtracted from the second TOA (TOA2 from FIG. 8) to obtain a pulse repetition frequency (PRF) for the true return. The first TOA and the second TOA can be read out from the DROIC 106 together and are subtracted in an external processor, e.g., processor 110 of FIG. 1, to calculate the PRF. It is also contemplated that the first TOA can be subtracted from the second TOA within the DROIC 106, wherein a single pulse period value is read out from the DROIC, e.g., instead of reading out the first and second TOAs to an external processor 110. Either the pulse repetition period of the pulse repetition frequency may also be referred to as the PRF code. The single pulse period representing the PRF code calculated within the DROIC 106. This calculation can either be performed using super pixel resources that are shared by multiple pixels or single pixel resources. These logical resources consist of adders and/or subtractors or the logical elements necessary to create the same. All of the aforementioned functionality can be occurring simultaneously as passive imaging data is also being acquired, collected, and processed in the imaging sensor array 102. The passive imaging data can be later read out through the DROIC 106.

The methods and systems of the present disclosure, as described above and shown in the drawings, provide for pulse repetition frequency decoding with superior properties including reduced intradevice bandwidth and processing resources needed compared with traditional methods. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method comprising:
acquiring a pulse detection bitmap from an imaging sensor array into a digital read out integrated circuit (DROIC);
filtering the pulse detection bitmap within the DROIC to convert the pulse detection bitmap into a filtered pulse detection bitmap; and
determining for a given pixel in the filtered pulse detection bitmap whether the pixel has a value that exceeds a threshold, indicating a true laser pulse return has been detected in the pixel.

2. The method as recited in claim 1, further comprising: reading out a location and a time of arrival (TOA) for at least one pixel in the filtered pulse detection bitmap that corresponds to a true laser pulse return location, and not reading out location or TOA for at least one pixel in the filtered pulse detection bitmap that does not correspond to a true laser pulse return location.

3. The method as recited in claim 1, wherein the acquiring the pulse detection bitmap includes recording a pulse indicator bit for each pixel in the imaging sensor array.

4. The method as recited in claim 3, wherein the pulse detection bitmap is binary, where a logical 1 indicates detection of a laser pulse at a given pixel in the imaging sensor array.

5. The method as recited in claim 1, wherein determining whether the pixel has a value that exceeds the threshold is performed in the DROIC.

6. The method as recited in claim 1, wherein filtering the pulse detection bitmap includes processing the pulse detection bitmap with a filter kernel by iteratively shifting the pulse detection bitmap over a kernel size using a pulse indicator bit as an enable to a counter.

7. The method as recited in claim 6, wherein a number of clocks provided to a counter between each shift represent kernel weighting values for filtering.

8. The method as recited in claim 1, wherein acquiring the pulse detection bitmap includes latching a value from a global counter into a local counter for each pixel, indicative of the TOA of a first pulse.

9. The method as recited in claim 1, further comprising calculating at least in part a pulse repetition frequency directly in a pixel array of the DROIC.

10. The method as recited in claim 8, wherein when a true return is detected, location and TOA for a given true return pixel are propagated to a second storage register in adjacent pixels within the DROIC through horizontal and/or vertical shifts.

11. The method as recited in claim 10, wherein the TOA for the true return pixel is a first TOA, and further comprising obtaining a second TOA associated with detection of a second laser pulse in the true return pixel and/or one or more of the adjacent pixels; and obtaining a pulse repetition frequency (PRF) for the true return by subtracting the first TOA from the second TOA.

12. The method as recited in claim 11, wherein the first TOA and the second TOA are read out from the DROIC together and are subtracted in an external processor to calculate the PRF.

13. The method as recited in claim 12, wherein the first TOA is subtracted from the second TOA within the DROIC, wherein a single pulse period value is read out from the DROIC.

14. The method as recited in claim 1, wherein passive imaging data is simultaneously acquired and later read out through the DROIC.

15. A system comprising:
an imaging sensor array; and
a read out integrated circuit operatively connecting the imaging sensor array to a digital read out integrated circuit (DROIC) for communicating a pulse detection bitmap from pixels in the imaging sensor array to corresponding pixels in the DROIC;
wherein the DROIC is configured to:
filter the pulse detection bitmap within the DROIC to convert the pulse detection bitmap into a filtered pulse detection bitmap; and
determine for a given pixel in the filtered pulse detection bitmap whether the pixel has a value that exceeds a threshold, indicating a true laser pulse return has been detected in the pixel.

16. A system as recited in claim 15, wherein the DROIC is configured to read out location and time of arrival (TOA) for at least one pixel in the filtered pulse detection bitmap that corresponds to a true laser pulse return location, and not reading out location or TOA for at least one pixel in the filtered pulse detection bitmap that does not correspond to a true laser pulse return location.

17. The system as recited in claim 16, wherein the imaging sensor array is configured to record a pulse indicator bit for each pixel in the imaging sensor array.

18. The system as recited in claim 15, wherein the DROIC is configured to acquire the pulse detection bitmap wherein the pulse detection bitmap is binary, where a logical 1 indicates detection of a laser pulse at a given pixel in the pulse detection bitmap.

19. The system as recited in claim 15, wherein the DROIC is configured to filter wherein filtering the pulse detection bitmap includes processing the pulse detection bitmap with a filter kernel by iteratively shifting the pulse detection bitmap over a kernel size using a pulse indicator bit as an enable to a counter.

20. The system as recited in claim 19, wherein the DROIC is configured so a number of clocks provided to a counter between each shift represents kernel weighting values for filtering.

21. The system as recited in claim 15, wherein the DROIC is configured to acquire the pulse detection bitmap wherein the pulse detection bitmap includes latching a value from a global counter into a local counter for each pixel, indicative of the time of arrival of a first pulse.

22. The system as recited in claim 15, wherein the DROIC is configured for calculating pulse repetition frequency directly in a pixel array of the DROIC.

23. The system as recited in claim 22, wherein the DROIC is configured so when a true return is detected, location and TOA for a given true return pixel are propagated to a second storage register in adjacent pixels within the DROIC through horizontal and/or vertical shifts.

24. The system as recited in claim 15, wherein the system is configured to acquire passive imaging data simultaneously wherein the DROIC is configured to receive the passive imaging data.

* * * * *